UNITED STATES PATENT OFFICE.

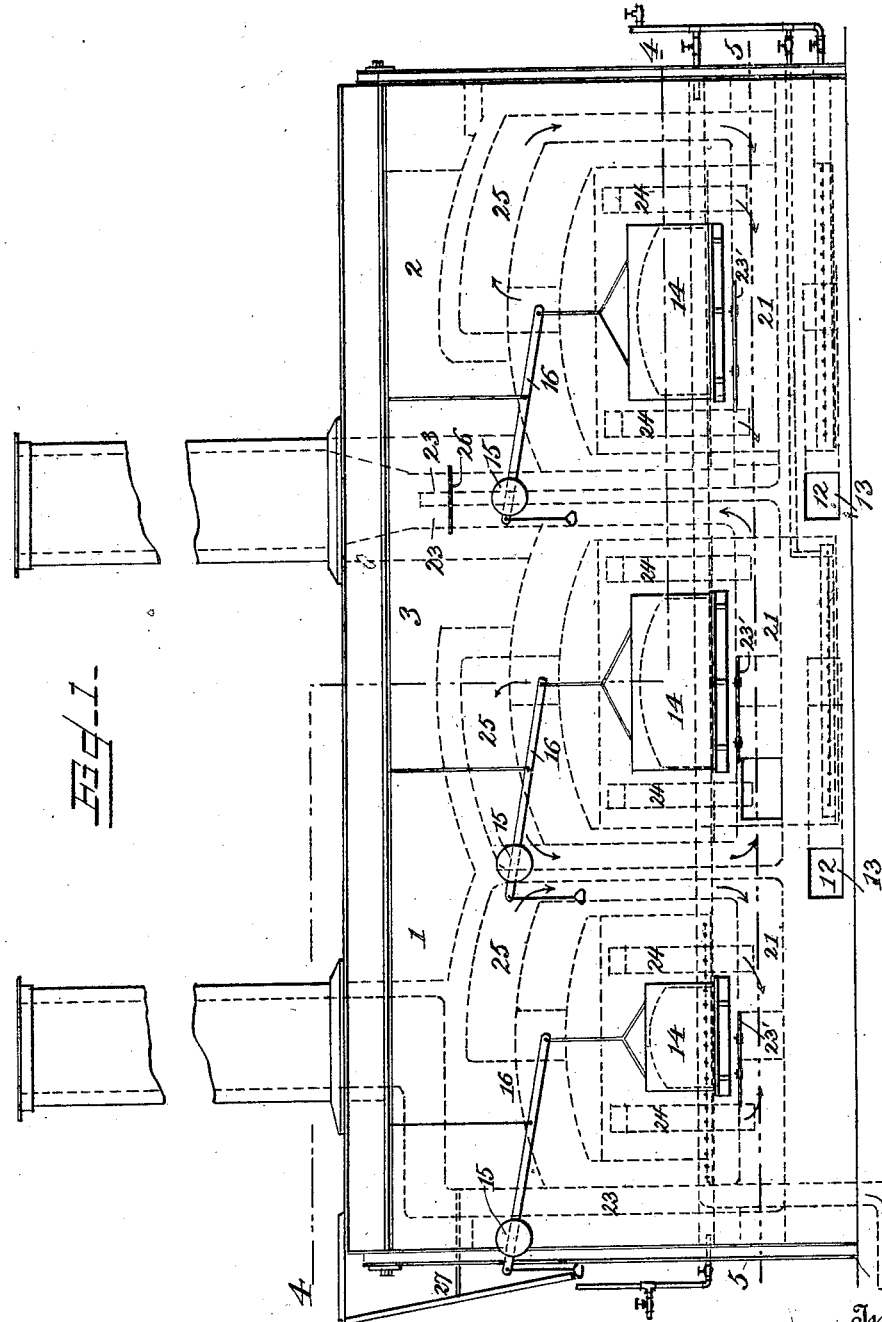

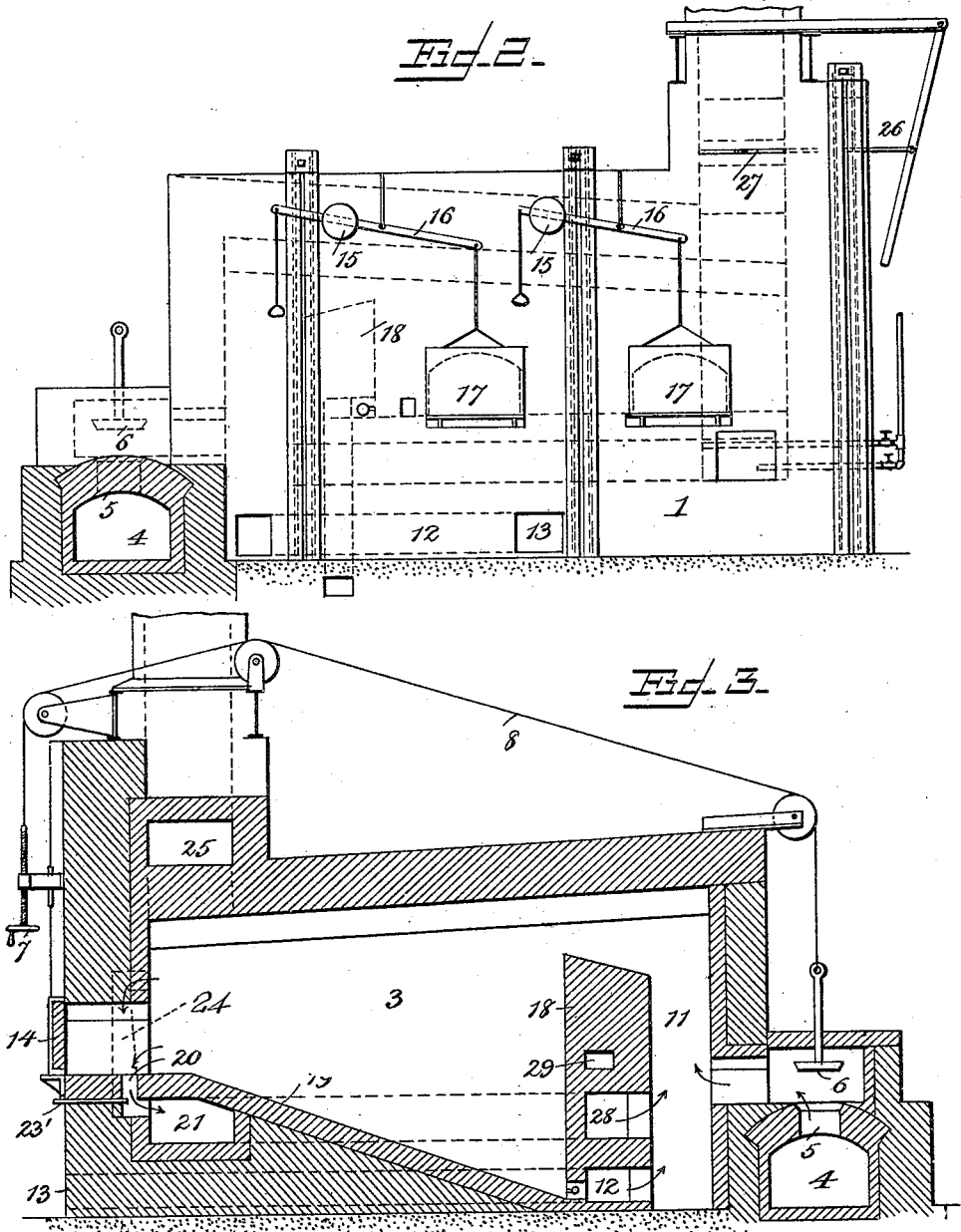

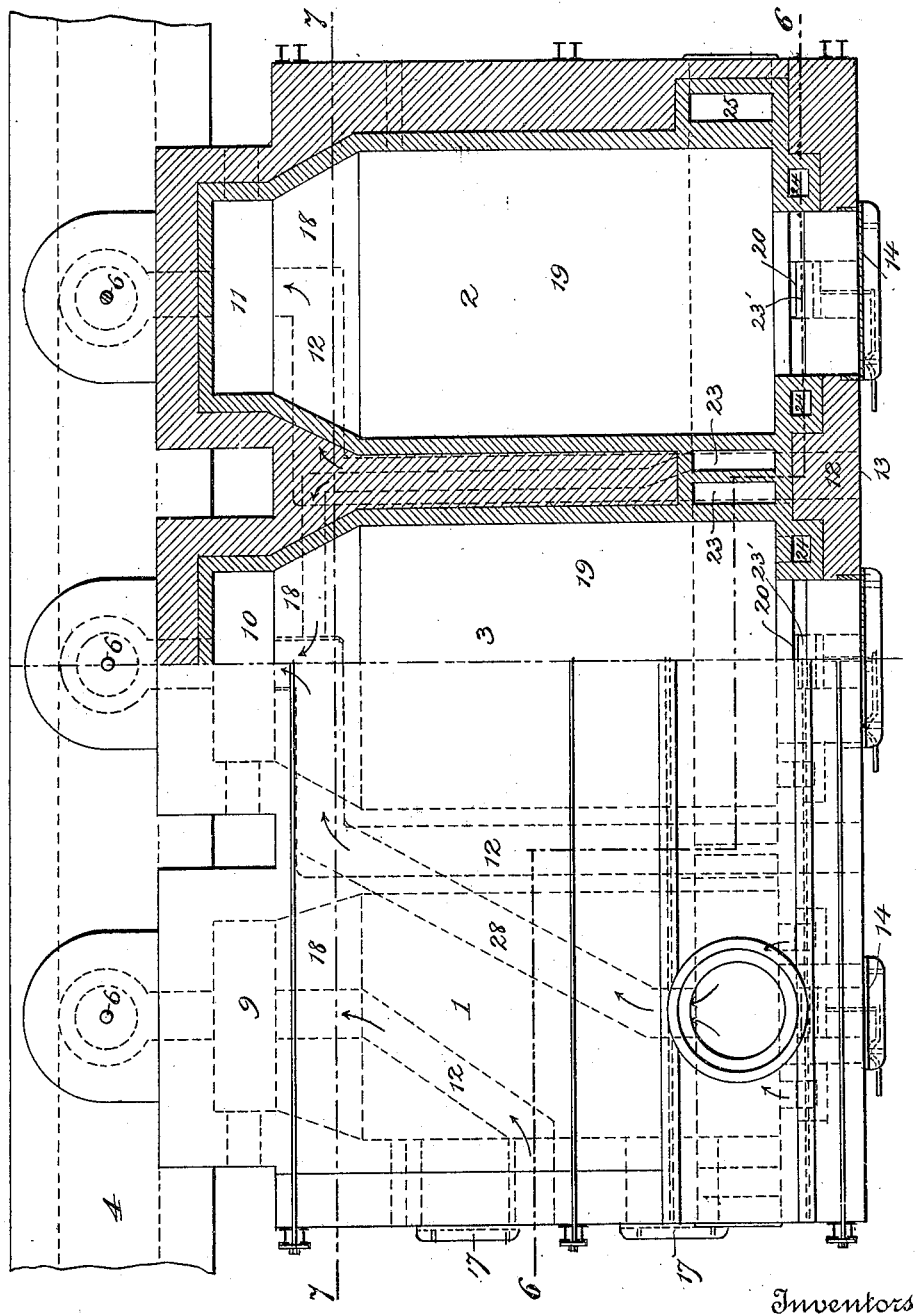

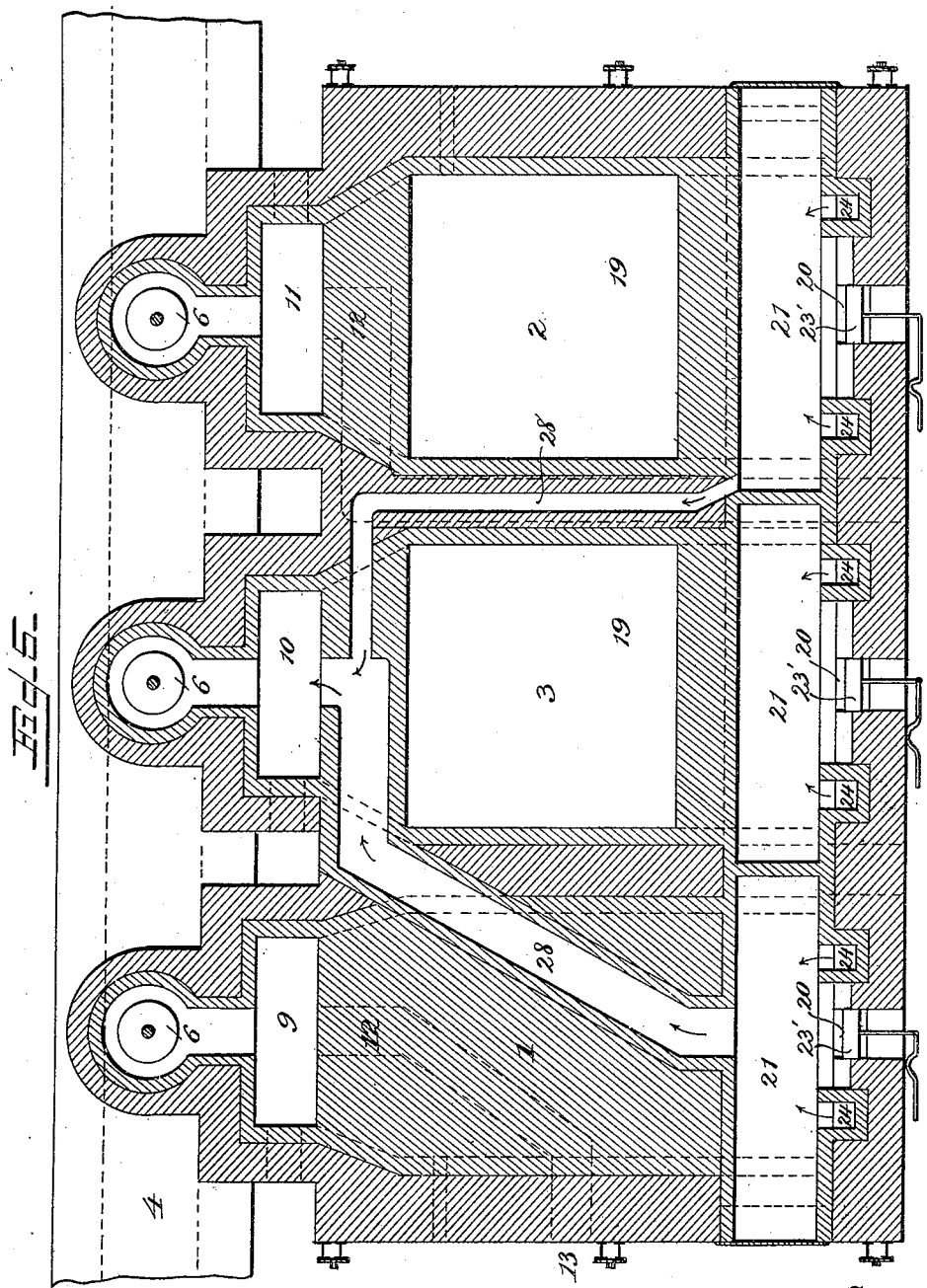

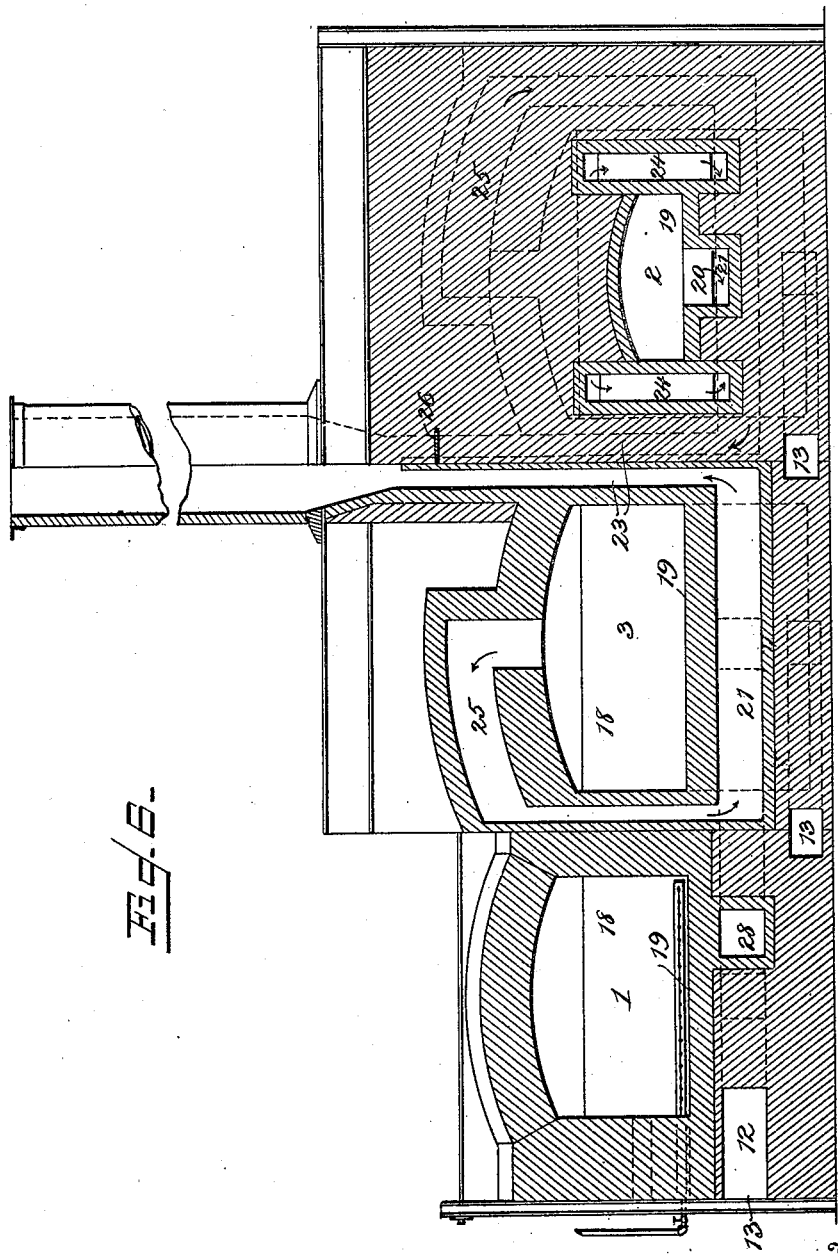

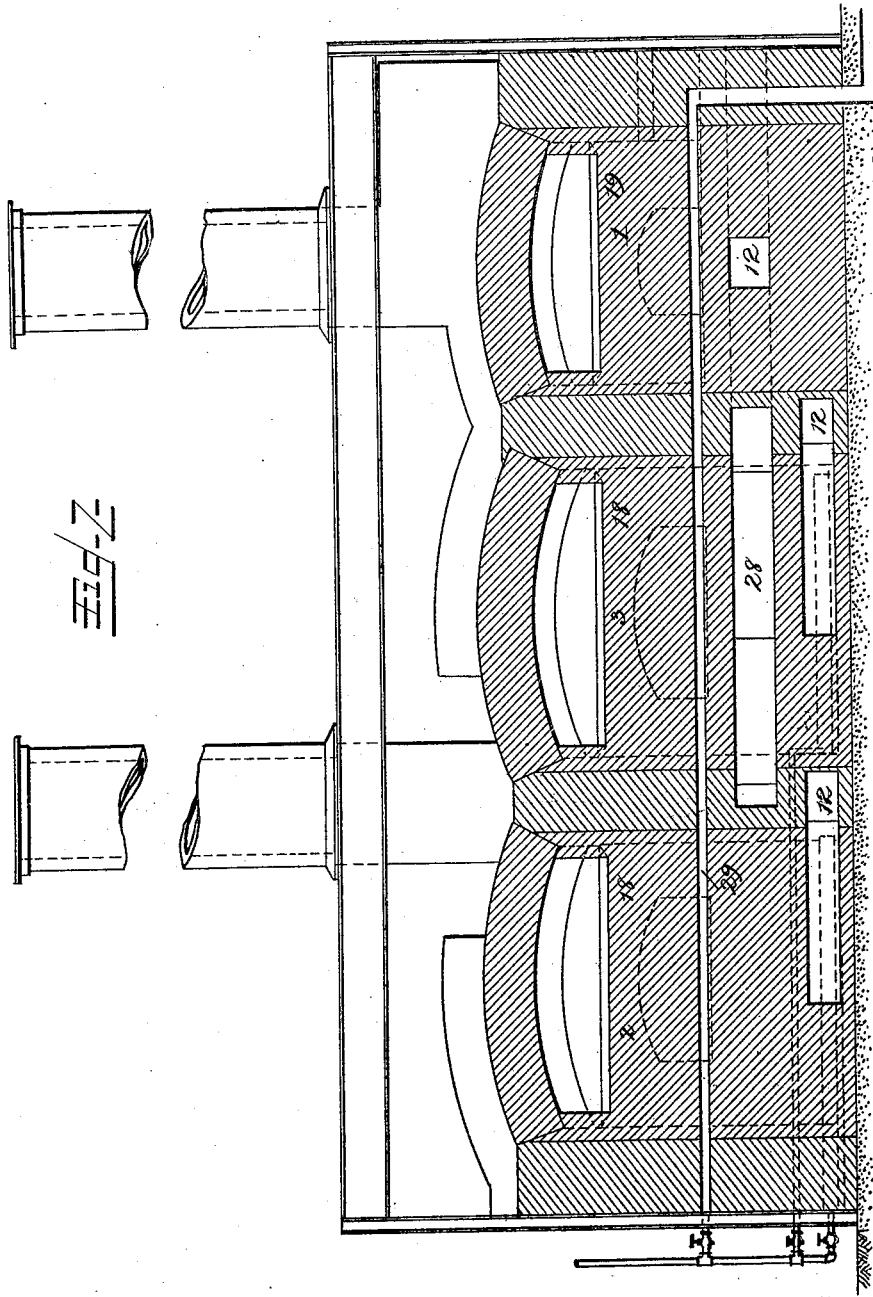

REGINALD A. BAILEY AND CHARLES C. HILDEBRAND, OF NEW CASTLE, PENNSYLVANIA.

FURNACE.

No. 914,226.   Specification of Letters Patent.   Patented March 2, 1909.

Application filed May 18, 1908. Serial No. 433,578.

*To all whom it may concern:*

Be it known that we, REGINALD A. BAILEY and CHARLES C. HILDEBRAND, citizens of the United States, residing at New Castle, in the county of Lawrence and State of Pennsylvania, have invented certain new and useful Improvements in Furnaces; and we do declare the following to be a full, clear, and exact description of the invention, such as will enable others skilled in the art to which it appertains to make and use the same.

This invention relates to improvements in furnaces, said improvements being adapted to be used with either gas or coal fired pair and sheet or pair and tin furnaces, there being no material difference in the application to the various kinds of furnaces except obvious ones.

The object of these improvements is to decrease the amount of fuel necessary to run the same by heating and reheating the air necessarily introduced into the furnace to support the combustion therein.

Another object is to produce novel means for controlling the position of the flame in the furnace when the furnace is open for charging the furnace with tin or sheets or for drawing the same.

Another object is to produce in a furnace of this kind convenient means for heating air to be used for heating, or melting greases or for similar purposes.

For these and still other objects which will appear as the description proceeds, the invention consists of certain novel features, arrangements and combinations of parts of which the herein described furnace is one of many possible embodiments.

In the annexed drawing forming a part of this specification in which like reference characters refer to like parts throughout the several views and which are for illustrative purposes only and therefore not drawn to any particular scale, Figure 1 is an end view of a bank of three furnaces provided with our improvements; Fig. 2 is a side view of one of said furnaces; Fig. 3 is a longitudinal sectional view of one of said furnaces; Fig. 4 is a horizontal sectional view taken on the line 4—4 of Fig. 1; Fig. 5 is a horizontal sectional view taken on the line 5—5 of Fig. 1; Fig. 6 is a vertical sectional view taken on the line 6—6 of Fig. 4, and, Fig. 7 is a sectional view taken on the line 7—7 of Fig. 4.

Referring more particularly to the drawing, our improvements are shown in connection with a bank of three furnaces showing outer furnaces 1 and 2 and an inner furnace 3. While it is particularly understood that any suitable form of fuel may be used and that the furnace may be a pair and sheet furnace or a pair and tin furnace, herein we have described a gas fired pair and sheet furnace. The gas is conducted through a conduit 4 and passes through valve openings 5 adjustably closable by valves 6 regulated by means of hand-wheels 7 connected to said valve by means of any flexible means 8. From said openings the gas passes into combustion chambers 9, 10 and 11 where the gas meets a supply of air brought in through the flue 12 from openings 13 communicating with the outside air.

It will be noticed that the flues 12 pass along by the various furnaces whereby the air passing through said flues is heated to a considerable extent before it comes in contact with the burning gas. This effects a considerable saving of fuel as the flame is not cooled.

The furnaces are furnished with sliding doors 14 suitably counterbalanced by weights 15 on levers 16, the end furnace 1 being provided on the sides thereof with similar doors 17. When the doors 14 and 17 are closed the flame passes from the combustion chamber over the bridge wall 18 across the floor or platform 19 of the furnace and the heated gases pass down through the down draft flues 20 into the main flues 21 whence said gases pass up to the stacks 22 by means of the side flues 23.

When the doors 14 are to be opened the dampers 23' are used to close the down draft flues 20 in which case the flame has to pass up near the roof of the furnace and through the top of the jamb flues 24 and through the top flues 25 down to the main flue 21. If, however, the dampers 26 and 27 be closed, the hot gases are forced through the passage 28 into the combustion chamber 10 of the middle furnace 3 to help support combustion in said center furnace. An auxiliary flue 29 passes through the bridge wall of the several furnaces and serves to conduct air therethrough and conducts the same to convenient points of application for heating offices or for heating greases or for furnishing heat for any purpose required.

It is thought that the advantages of our invention are obvious. The outside air in passing through the flues 12 is heated to such a temperature that there is no particular cooling of the flame in the combustion chamber by the air which is necessary to support the combustion thereof.

When the damper 23 is opened, the flame passes over the floor 19 of the furnace where it is most needed but when the damper 23 is closed, the flame must go upwardly in order for the hot gases to pass out through the jamb flues 24 and the top flues 25. This takes the flame away from the floor of the furnaces so that the operator may be able to see readily. When the dampers 26 and 27 are closed, the hot gases which have passed through the two end furnaces are then conducted by means of the flues 28 to the combustion chamber of the middle furnace where the remaining oxygen is used to support combustion in the middle furnace. The gas on entrance to the middle furnace is heated so nearly to the proper temperature that almost no fuel is required to keep the middle furnace heated to a proper temperature.

It is particularly understood that we do not limit ourselves to the locations of the various flues herein described but may pass them through any part of the furnaces desired.

Having thus described our invention, what we claim as new and desire to secure by U. S. Letters-Patent is:—

1. In combination, a plurality of furnaces, combustion chambers therefor, a fuel supply conduit and air supply conduits leading to the combustion chambers, a main outlet flue and means for leading the heated gases from the combustion chambers either in a direct or upward indirect course to the main outlet flue.

2. In combination, a plurality of furnaces, combustion chambers therefor, a fuel supply conduit and air supply conduits leading to the combustion chambers, a main outlet flue, means for leading the heated gases from the combustion chambers either in a direct or upward indirect course to the main outlet flue, and manually operated means for closing communication between the supply conduit and either of said combustion chambers.

3. In combination, a plurality of furnaces, combustion chambers therefor, a fuel supply conduit and air supply conduits leading to said combustion chambers, a main outlet flue, means for leading the heated gases either in a direct course from the combustion chambers to the main outlet flue or for causing the heated gases to pass in an upward course toward the tops of the furnaces before entrance to the main outlet flue, and manually operated means for closing communication between the fuel supply conduit and the combustion chamber of each furnace.

4. In combination, a plurality of furnaces, combustion chambers therefor, a main horizontal outlet flue, a fuel supply conduit and air supply conduits leading to said combustion chambers, down draft flues for leading the heated gases directly to the outlet flue, and jamb and top flues for causing the heated gases to pass in an upward indirect course from the combustion chambers before entrance to the main outlet flue with means for closing communication between said down-draft flues and said outlet flue.

5. In combination, a plurality of furnaces, combustion chambers therefor, a fuel supply conduit, a main outlet at the front of the combustion chambers, stacks for said furnaces, side flues for leading the heated gases from said main outlet to said stacks, means for closing said side flues and passages for leading the heated gases from the combustion chambers of certain of the furnaces to the combustion chamber of another of said furnaces when the side flues are closed.

6. In combination, a plurality of furnaces, combustion chambers therefor, an outlet flue, a fuel supply conduit, a bridge wall extending across the combustion chambers, air supply conduits leading through said bridge wall and communicating with the combustion chambers, down-draft flues for leading the heated gases directly to the outlet flue, jamb and top flues for causing the heated gases to pass in an upward indirect course from the combustion chambers before entrance to the outlet flue, and means for closing communication between said down-draft flues and said outlet flue.

In testimony whereof we have hereunto set our hands in presence of two subscribing witnesses.

REGINALD A. BAILEY.
CHARLES C. HILDEBRAND.

Witnesses:
WILLIAM IRA McLAUGHLIN,
EDWIN E. KEELER.